United States Patent [19]

Shiozaki et al.

[11] Patent Number: 4,683,533
[45] Date of Patent: Jul. 28, 1987

[54] STORAGE CONTROL SYSTEM USING PLURAL BUFFER ADDRESS ARRAYS

[75] Inventors: Kenichi Shiozaki, Odawara; Kanji Kubo, Hadano, both of Japan

[73] Assignee: Hitachi, Ltd., Tokyo, Japan

[21] Appl. No.: 664,771

[22] Filed: Oct. 25, 1984

[30] Foreign Application Priority Data

Oct. 27, 1983 [JP] Japan .................. 58-202004

[51] Int. Cl.<sup>4</sup> .................. G06F 13/00; G11C 29/00
[52] U.S. Cl. .................. 364/200
[58] Field of Search ... 364/200 MS File, 900 MS File

[56] References Cited

U.S. PATENT DOCUMENTS

| | | | |
|---|---|---|---|
| 3,573,745 | 4/1971 | May | 364/900 |
| 3,618,040 | 11/1971 | Iwamoto et al. | 364/200 |
| 4,056,844 | 11/1977 | Izumi | 364/200 |
| 4,349,871 | 9/1982 | Lary | 364/200 |
| 4,392,200 | 7/1983 | Arulpragasam et al. | 364/200 |

Primary Examiner—Archie E. Williams, Jr.
Assistant Examiner—Lawrence E. Anderson
Attorney, Agent, or Firm—Antonelli, Terry & Wands

[57] ABSTRACT

A storage control system controls the update operations on two buffer address arrays in a data processing system in which a plurality of processors are connected to a shared storage, at least one of the processors having a buffer storage. The first buffer address array is the directory of buffer storage. The second buffer address array contains the same data as that of the first buffer address array. The storage control system updates first the content of the second buffer address array then that of the first buffer address array in response to a block transfer to the buffer storage of the own processor and a store operation conducted by other processor on the shared storage. The storage control system permits to accept a new access request occurred in the own processor on condition that a block transfer to the own processor is finished and that the first buffer address array is updated in association with the block transfer.

2 Claims, 5 Drawing Figures

STORAGE CONTROL SYSTEM USING PLURAL BUFFER ADDRESS ARRAYS

BACKGROUND OF THE INVENTION

The present invention relates to a storage control system using plural buffer address arrays, and in particular, to a storage control system comprising a first buffer address array as a buffer storage directory for registering thereto an address of data copied from a shared storage into a buffer storage of each processor and a second buffer address array independent of the first buffer address array and which is provided for a store address check requested from another processor.

A data processing system reads data such as instructions and operands from a main storage and supplies this data to a processor to execute data processing. The main storage has a large capacity and requires a longer access time for accessing data therein as compared with the processing speed of the processor. Consequently, a required data item can be obtained for use in a higher speed as follows. A processor is provided with a buffer storage which has a higher access speed and a smaller capacity than the main storage and the processor accesses the buffer storage onto which data stored in the main storage and to be used more frequently is copied. Whether the required data exists in the buffer (in-buffer state) or not (not-in-buffer state) is determined by referring to an associated buffer address array provided as a directory.

In a multiprocessor system including processors having such buffer storages and which share the main storage, if a processor updates a data item stored at a given address in the main storage and if the data item stored at the given address has been retained in a buffer storage of another processor, there appears a conflict between the data items on the buffer and main storages. The U.S. Pat. No. 3,618,040 has disclosed a multiprocessor system in which the main storage is shared among processors having buffer storages. In accordance with the U.S. Pat. No. 3,618,040, a store address for storing a data item is broadcast to the other processors, which then refer to a buffer address array in order to determine whether or not the broadcast address has been registered to the buffer address array. If this is the case, the registered address is made to be invalid (canceled).

In accordance with the U.S. Pat. No. 4,056,844, the buffer address array described above is defined as a first address array and there is provided a second address array for storing the same data as the first address array. The address broadcast from another processor is checked for the registration thereof by referring to the second address array. This provision prevents the referring operation of the processor associated with the first address array from being blocked by the referring operation thereof with respect to the address broadcast from the other processor.

Update operations for the first and second arrays are as follows. When the data at a requested address is not found in the buffer storage and the data of a block (for instance, 64 bytes) at locations including the requested address is replaced by executing a block transfer from the main storage to the buffer storage, the address of the replaced block is registered, and when an address broadcast from another processor is retained, the address registration is canceled (to be invalid).

Conventionally, the first control table (address array) and the second control table (address array) are updated in the manner described below.

(1) For a block transfer, an update request for the first address array is issued when the data transfer from the main storage to the buffer memory (storage) is completed, while an update request for the second address array is made when a read (fetch) request is issued to the main storage. As described above, the update operations of the first and second address arrays are executed independently to each other.

(2) For a write (store) operation by another processor to the main storage, an update request is issued first to the second address array when a fetch request is made to the main storage, and thereafter the first address array is updated.

(3) When a conflict takes place in the update operations in (1) and (2) above, the first address array is updated regardless of the sequence of processing for the main storage, while the second address array is updated in accordance with the sequence for accessing the main storage.

The prior art has the following problems. For example, in a program in which a first processor executes a store request in the order of address X and address Y on a main storage conducting communications with another system and a second processor fetches data stored at address X after confirming that the first processor has updated data at address Y (in this program, it is naturally assumed that data at address X has been updated if the update at address Y has been completed), the first processor executes the store operation first at address X then at address Y, while the second processor carries out the fetch operation in the sequence of address Y and address X. For a Y address fetch request issued from the own processor, a check is made to determine whether or not the pertinent data has been registered to the buffer memory by use of the first address array associated with the second processor. If this is the case, the data is read from the buffer memory; otherwise, a block transfer is executed from the main storage to the buffer storage. If the request from the first processor for a store operation at address Y of the main storage has been finished in this case, the second processor issues a request to read data stored at address X after the block transfer is completed, so the first address array is checked to determine whether or not the relevant data has been registered to the buffer storage. If the operation for invalidating the data of the second address array due to the request from the first processor for storing data at address X in the main storage has been delayed and has not been completed, the X address registered to the first address array in advance remains unchanged, thus the second processor reads the data from the buffer memory. The data fetched contains an old information, that is, the second processor has obtained an invalid data item.

To prevent such a fetch operation which reads an invalid data item, the following techniques have been conventionally employed. A serialize instruction is inserted between a Y address fetch operation and an X address fetch operation in order to check the completion of the invalidating operation for the buffer storage caused by a store request from the first processor for storing data at address X (restriction on the program), or the second processor is prevented from referring to the buffer storage when an invalidating operation is executed on the second address array and the first address array (if it is found by checking the second address array that the data has been registered) due to a store request from the first processor for storing data in the main storage. However, the former method imposes a severe restriction on the programmer and the inserted serialize instruction lowers the performance, whereas the latter method also reduces the performance because the operation executed to refer to the buffer memory is unconditionally prevented.

SUMMARY OF THE INVENTION

It is therefore an object of the present invention to provide a storage control system which avoids an invalid operation due to a temporary data inconsistency between the buffer storage and the shared storage associated with the update operation conducted on the first and second address arrays.

Another object of the present invention is to provide a storage control system which prevents the update operation to be executed on the first and second address arrays by use of an address broadcast from a first processor from being delayed in time as compared with a fetch request from a second processor associated with the first and second address arrays.

In accordance with the present invention, the content of the second buffer address array of the second processor is updated when the second processor stores data in the shared storage, and thereafter the content of the first buffer address array is updated, thereby synchronizing the update operations on the first and second buffer address arrays. A new access request which has occured in the second processor is accepted when a block transfer from the shared storage to the buffer storage of the second processor is completed and the first buffer address array is updated in association with the block transfer.

DESCRIPTION OF THE PREFERRED EMBODIMENT

Figure 1:
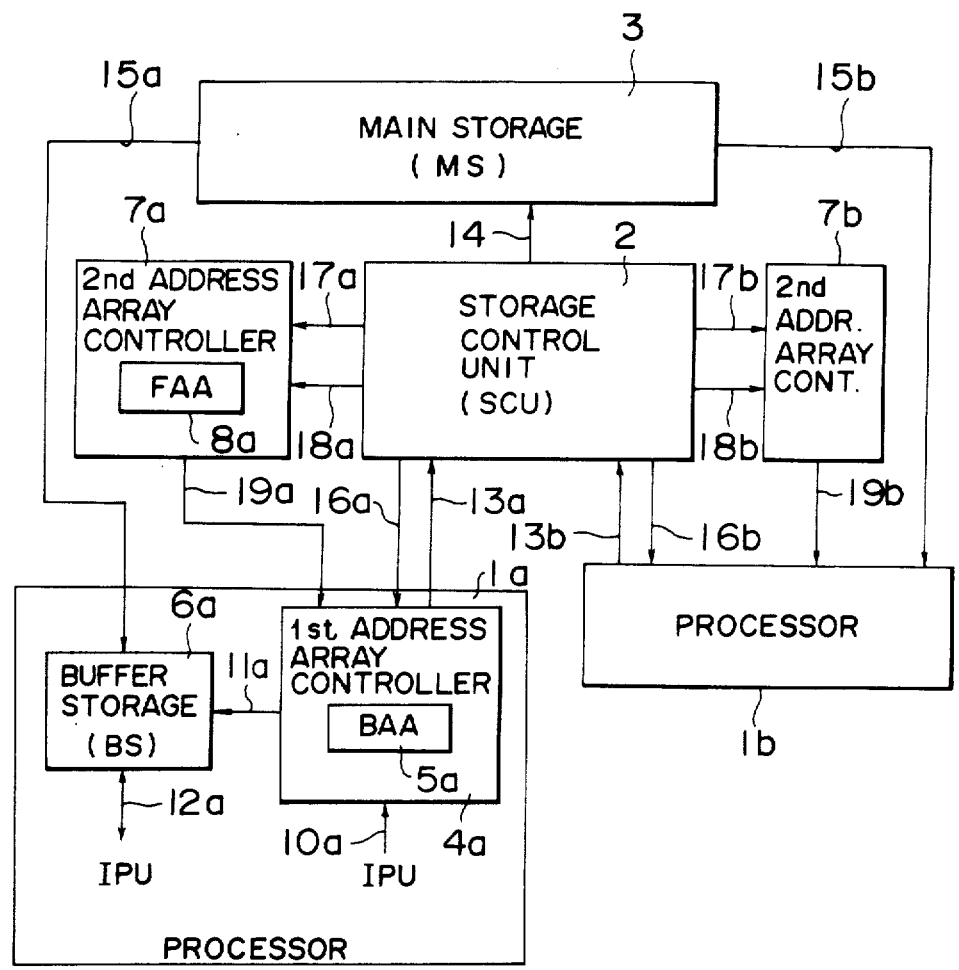
FIG. 1 is a schematic block diagram depicting an embodiment in accordance with the present invention.

Referring to FIG. 1, there is depicted a schematic block diagram of an embodiment of the present invention. A main storage (MS) 3 is shared between two processors 1a and 1b through a storage control unit (SCU) 2. The processor 1b is identical to the processor 1a and is denoted with a reference code b, so the details thereof are not shown.

The processor 1a has therein an instruction processing unit (IPU not shown) to be utilized to request a fetch or store access to a first address array controller 4a via a line 10a. The first array controller 4a has a first buffer address array (BAA) 5a, which may be the same as disclosed in the U.S. Pat. No. 4,056,844 described before.

When an access request is received via the line 10a, the first address array controller 4a checks the BAA 5a to determine whether or not the required data exists in a buffer storage (BS) 6a. If the data is found therein (referred to as the in-BS state), the controller 4a issues a data fetch request via a line 11a to the BS 6a. When the data is read, the BS 6a transfers it via a line 12a to the IPU. If the required data is missing (referred to as the not-in-BS state), the first address array controller 4a issues a fetch request via a line 13a to the SCU 2 to read data from the MS 3. The operations described above will be referred to as block transfer hereinbelow. A block transfer request received via the line 13a is compared with an MS request from another processor (including input/output units) for accessing the MS 3 in the SCU 2. If the line 13a has the higher priority, a block transfer request is issued through a line 14 to the MS 3. On receiving the request, the MS 3 transfers a block of data to the BS 6a, which then stores the block data from a line 15a and simultaneously passes the objective data through the line 12a to the IPU.

The SCU 2 has a line 16a connected to the first address array controller 4a and which is used as an advance signal line to indicate a block transfer from the MS 3 to the BS 6a.

The SCU 2 is connected to a second address array controller 7a associated with the processor 1a and to a second address array controller 7b associated with the processor 1b, the controllers 7a and 7b being provided with second buffer address arrays (also called front address arrays: FAAs) 8a and 8b, respectively. The FAA 8a may be identical to that disclosed in the U.S. Pat. No. 4,056,844.

When a block transfer is executed from the MS 3 to the BS 6a of the processor 1a, the address used for the block transfer is registered through a registration indication signal line 17a from the SCU 2 to the second address array controller 7a. If an update (address replace operation) is conducted on the FAA 8a in association with the block transfer, the second address array controller 7a issues an indication via a line 19a to the first address array controller 4a for registering the address specified for the block transfer (i.e. a replace request is issued). When the block transfer is completed and the conditions for the replace request are satisfied, the first address array controller 4a updates the content of BAA 5a. Consequently, the same data is stored in the BAA 5a and FAA 8a.

On the other hand, when an MS request issued from the other processor 1b through a line 13b is selected by the SCU 2, a fetch or store request is issued from the SCU 2 to the MS 3 via the line 14 in the same way as described above. For a fetch request, the data read from the MS 3 is transferred through a line 15b to the other processor 1b that has issued the fetch request. When a store request is made from the processor 1b, the data received from the line 14 is written in the MS 3 and the SCU 2 simultaneously issues a store address check request via a line 18a to the second address array controller 7a of the processor 1a. On receiving the store address check request, the second address array controller 7a checks whether or not the relevant address exists in the FFA 8a. If this is the case, the information stored in the pertinent area of the FAA 8a is invalidated (that is, the address registration is canceled), and at the same time, a cancel request for the BAA 5a is issued through the line 19a to the first address array controller 4a. When receiving the cancel request from the line 19a, the controller 4a invalidates the relevant area of the BAA 5a.

The operations of the BAA 5a and FAA 8a in accordance with the present invention have been briefly described hereabove. The operations to be carried out on the side of processor 1b are completely the same as those on the processor 1a side. The processor 1b may be an input/output processor (IOP) not having the buffer storage for controlling input/output devices. In such a configuration, the processor 1b does not comprise the first address array controller 4a nor the second address array controller 7b.

Figure 2:
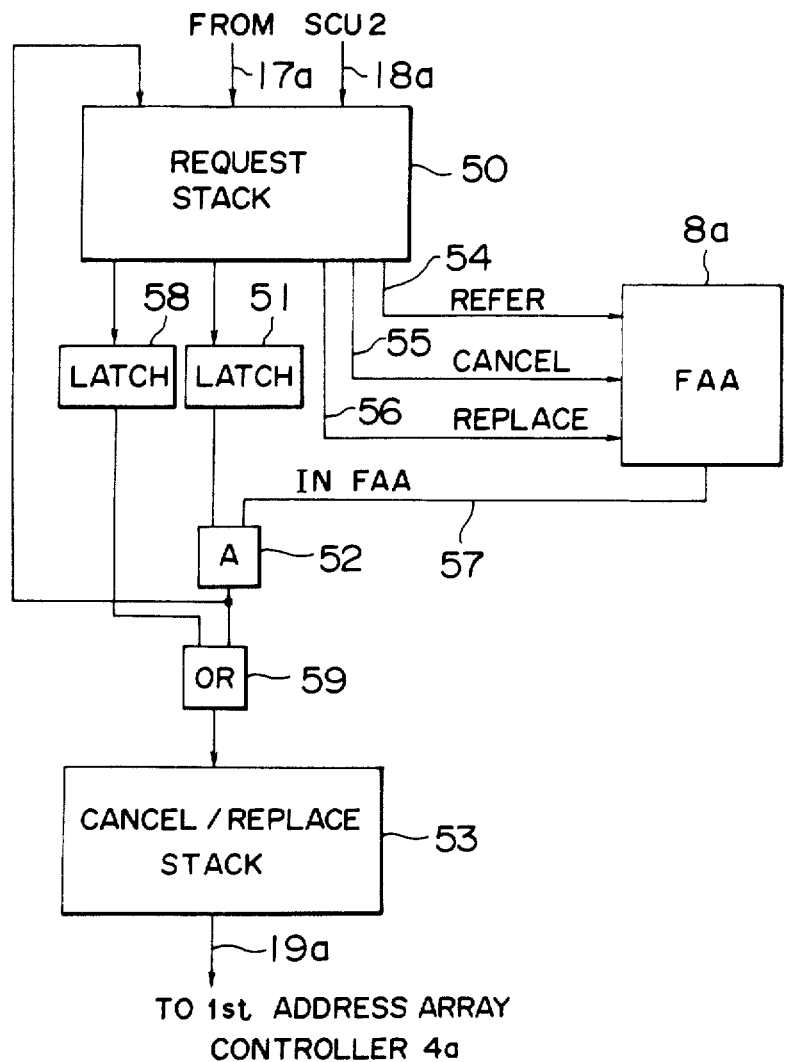
FIG. 2 is the block diagram illustrating in detail a second address array of FIG. 1.

FIG. 2 illustrates in detail the second address array controller 7a of FIG. 1. The FAA update requests from the SCU 2 are stacked in a request stack 50 in the request reception order. For a block transfer request from the processor 1a, an address registration indication together with an address for the block transfer is transmitted through the line 17a to the FAA 8a. For a store request from the other processor 1b for storing data in the MS 3, a store address request together with a store address is issued to the line 18a. The request stack 50 operates in accordance with the first-in first-out algorithm, that is, the data items are stacked and read in the order in which the data items are received. That is, the read operation for a request stacked in the request stack 50 after a lot of requests already stacked will be carried out only after such requests are read. If the request fetched from the stack 50 is a registration instruction due to a block transfer, a replace request is issued via a line 56 to the FAA 8a and is set to a registration request latch 58 at the same time. The FAA 8a replaces the old address with the address received together with the replace request. The registration request and address latched in the registration request latch 58 are stacked in a cancel/replace stack 53 through an OR circuit 59. Conventionally, the system is not configured so as to pass the registration request from the second address array controller 7a to the first address array controller 4a.

If the output from the request stack 50 is a request for a store address check, a refer indication is delivered via a line 54 to the FAA 8a and is simultaneously set to a cancel request latch 51. The FAA 8a checks whether or not the address received together with the reference indication exists in the FAA 8a. If the address is found, the FAA 8a outputs an in-FAA signal to a line 57. This signal opens an AND circuit 52 so that the cancel request and address are stacked in the cancel/replace stack 53. At the same time, the output from the AND circuit 52 is stored as a cancel request in the request stack 50, and it is fed as a cancel request to the FAA 8a through a line 55 from the stack 50.

Figure 3:
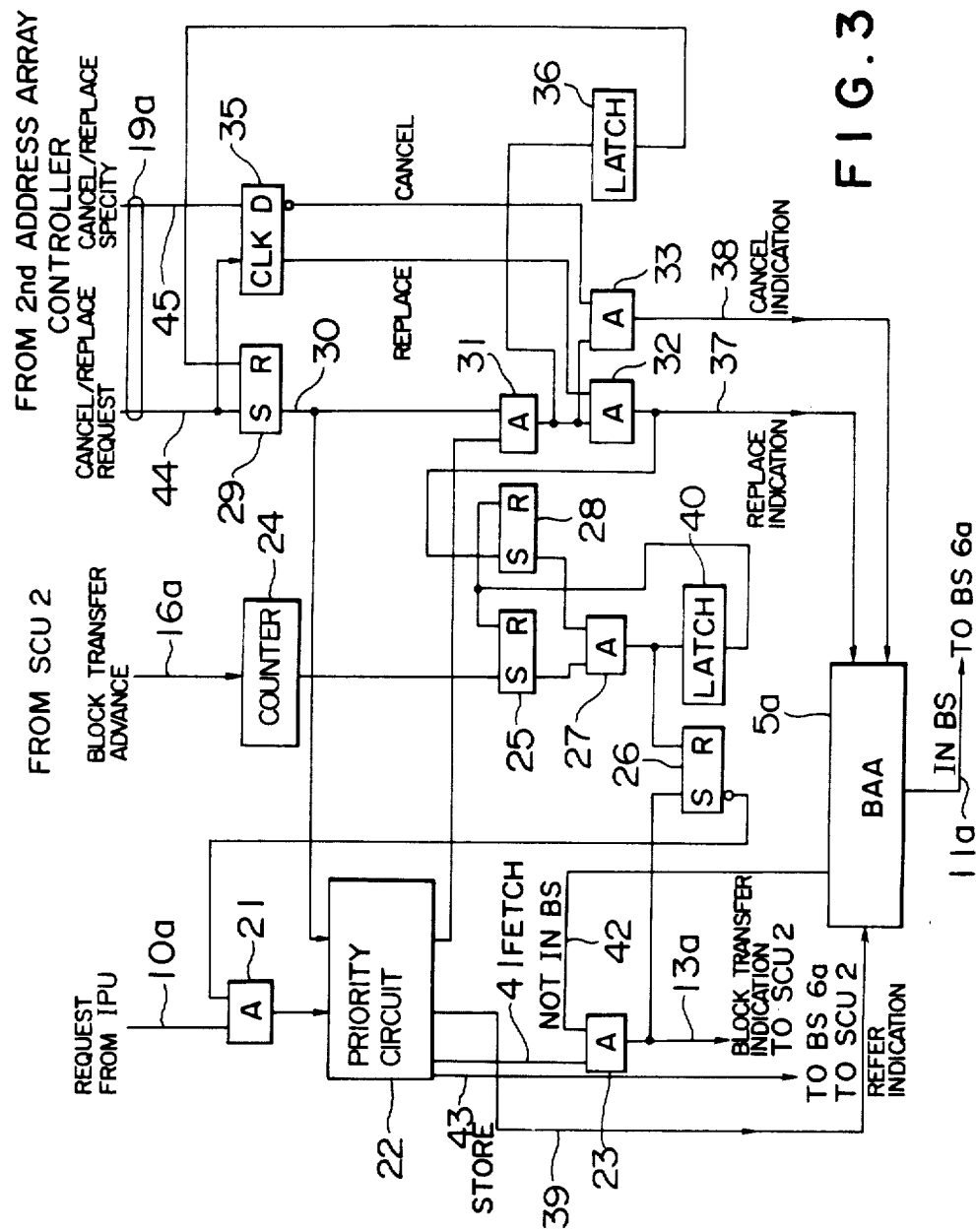
FIG. 3 is a block diagram depicting the first address array of FIG. 1.

FIG. 3 depicts in detail the first address array controller of FIG. 1. In FIG. 3, a memory access request from the IPU is delivered via the line 10a to an AND circuit 21. As will be described later in this specification, since a flip-flop 26 is set in the normal state, the memory access request from the IPU is transferred through the AND circuit 21 to a priority circuit 22. A set output from a flip-flop 29 to be described later is supplied to the priority circuit 22. One of these inputs is accepted depending on the condition. For the priority circuit 22, the set output from the flip-flop 29 takes precedence. Consequently, when the flip-flop 29 is in the reset state, the priority circuit 22 accepts an access request from the IPU. On receiving the access request from the IPU, the priority circuit 22 delivers a refer indication via a line 39 to the BAA 5a. With the refer indication, the address for the access request from the IPU (not shown) is also fed to the BAA 5a, which then checks whether the address has been registered. As a result, if it is found that the in-BS state has been set, the BS is accessed (for a fetch or store operation) as illustrated in FIG. 1. For a fetch request, if a not-in-BS signal is found on a line 41, a signal indicating the not-in-BS state is transferred through a line 42 from the BAA 5a, then an AND circuit 23 is opened so that a block transfer is indicated to the SCU 2 through the line 13a. At the same time, the flip-flop 26 is set and the AND circuit 21 is closed so as to block the subsequent access request from the IPU. If the access request from the IPU is a store request, a signal indicating the store request is outputted to a line 43 when the refer indication is transferred to the line 39. In the in-BS state, the store data from the IPU is stored in the BS 6a and also in the MS 3. In the not-in-BS state, the store data is stored only in the MS 3. In a system to which the store-in-BS configuration applies, the BS 6a is loaded with the data in the in-BS state, and only the address for the cancel request is transferred to the SCU 2, thereby allowing the address to be broadcast to the other processor.

When a block transfer advance signal is returned via the line 16a from the SCU 2 in response to a block transfer request to the SCU 2, the advance signal is counted by use of a counter 24. That is, a block transfer is completed by several transfer operations, for instance, a 64-byte block transfer is performed by four 16-byte data transfer operations. An advance signal is delivered each time the data transfer operation is carried out. Assuming that a block transfer comprises four data transfer operations, when four advance signals are returned, an output from the counter 24 is used to set a block transfer terminate flip-flop 25.

On the other hand, since the SCU 3 is issuing a registration indication to the second address array controller 7a concurrently with the block transfer operation as described before, the registration indication (replace request) is fed through the line 19a from the second address array controller 7a when the update of the FAA 8a is finished. A cancel or replace request is identified by a signal from a line 45. With a replace request, the flip-flop is set; and if the signal on the line 45 is "1" in this case, a flip-flop 35 is also set. A set output from the flip-flop 29 passes through a line 30 and the priority circuit 22, and a replace request is fed through a line 37 to the BAA 5a via AND circuits 31 and 32. At the same time, an output from the AND circuit 31 is transferred via a latch circuit 36 to the flip-flop 29 so as to reset the flip-flop 29. If a replace request is issued via the line 37 to the BAA 5a, a flip-flop 28 is simultaneously reset. As a result, an AND circuit 27 is opened with the set output delivered from the flip-flop 25 for indicating the end of block termination, the flip-flop which has been requesting a block transfer is reset, and the AND circuit 21 is enabled to accept the subsequent memory access request. The flip-flops 25 and 28 are reset by a latch circuit 40 after a preset time period.

In the prior art, the flip-flop 26 is set when a block transfer request is transmitted to the SCU 2, and the block transfer termination is indicated by the counter 24. When the block transfer is finished, the flip-flop 26 is reset in order to make it possible to receive the subsequent memory access request, and a registration indication is delivered to the BAA 5a at the same time, that is, the update operations on the BAA 5a and FAA 8a are executed asynchronously.

A cancel request for the BAA 5a in association with the store address check for a store request from another processor is transferred through the line 19a from the second address array controller 7a. This cancel request causes the flip-flop 29 to be set. A cancel or replace request is identified by use of a signal from a line 34. For a cancel request, the signal on the line 45 is "0", so the flip-flop 35 is reset. An output from the flip-flop 29 passes the line 30 and the priority circuit 22 so that a cancel request is fed to the BAA 5a via the AND circuits 31 and 33. At the same time, an output from the AND circuit 31 is passed through the latch circuit 36 and is delivered to the flip-flop 29 to be reset.

Figure 4:
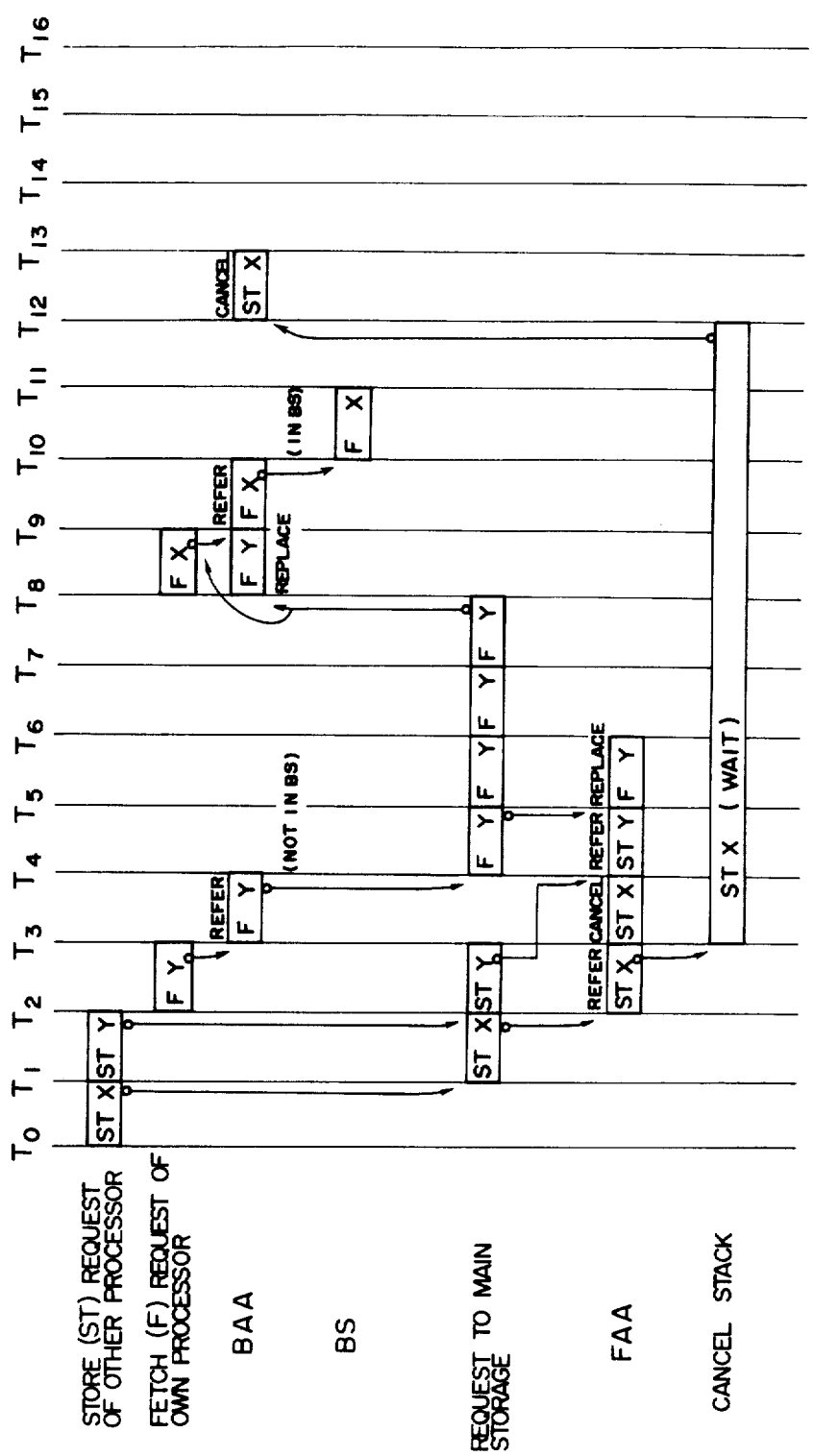
FIG. 4 is a timing chart for explaining operations of the prior art system.

For the better understanding of the present invention, FIG. 4 illustrates a timing chart of refer and update operations to be carried out by the BAA and FAA. In this chart, ST, F, STX, and FX indicate a store request, a fetch request, a store request for address X, and a fetch request for address X, respectively. As described before, FIG. 4 depicts a timing chart, viewed from one processor, for a processing flow in which the other processor requests STX and STY, and the one processor requests FY and FX. The other processor, issues the requests of STX and STY at $t_0$ and $t_1$. These requests cause a store request to the MS, respectively. The second address array controller associated with the one processor refers to the FAA by use of address X at $T_2$. For an in-FAA signal, the address X registered to the FAA is canceled at $T_3$ and is stacked in the cancel stack at the same time. For the STY request, although the FAA is referred to at $T_4$, the not-in-FAA state in notified. When the one processor issues an FY request, the BAA is referred to at $T_3$. Since the system is in the not-in-BS state, a block transfer is conducted for four cycles beginning from $T_4$. A replace operation on the FAA is executed at $T_5$. Conventionally, since a replace operation on the BAA is conducted and the subsequent access is enabled to be received when a block transfer is finished, an FX request following the FY is accepted at $T_8$ and the BAA is referred to at $T_9$. In this case, if an STX stacked in the cancel stack and is held in the wait state due to other request previously stacked is kept in the wait state, for example, up to time $T_{12}$, the address X on the BAA remains registered and the in-BS state is indicated, hence an old data item stored prior to a store operation at $T_{10}$ will be fetched.

Figure 5:
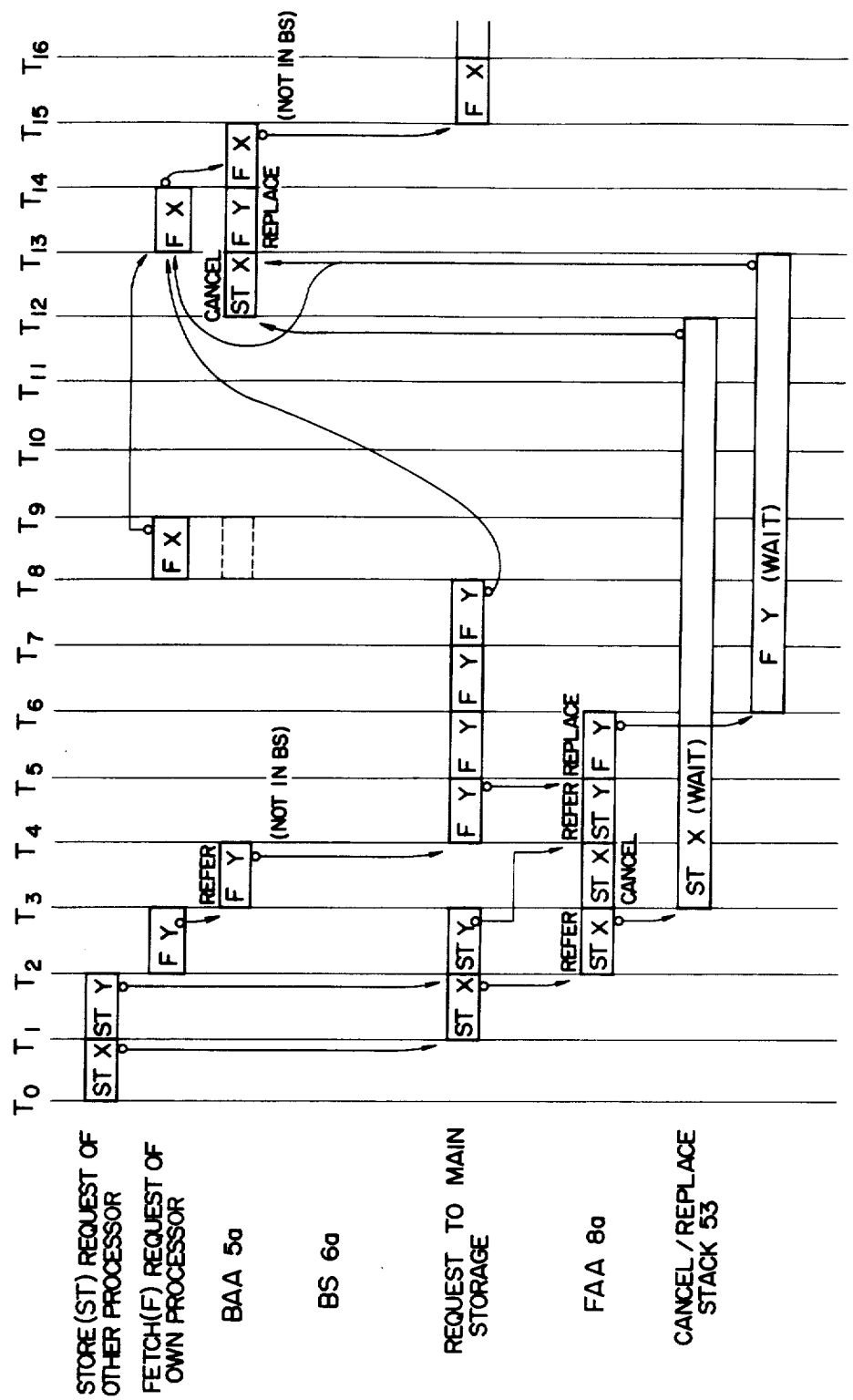
FIG. 5 is a timing chart for explaining operations of the embodiment depicted in FIG. 1 to FIG. 3.

FIG. 5 illustrates a time chart of refer and update operations of the BAA and FAA in an embodiment of the present invention under the same conditions as for the time chart of FIG. 4. In accordance with the present invention, the update operations on the BAA and FAA are synchronously conducted, and a refer operation on the BAA for the subsequent memory access request from the one processor is prevented until a replace operation on the BAA is finished for the preceding memory access request. As can be seen from FIG. 5, therefore, a replace request ($T_5$) for the FAA due to an FY request preceding an FX request is also stacked in the cancel/replace stack 53, and the address Y is registered to the BAA 5 by a request resulted from the FAA replace request. The subsequent FX request is accepted when the block transfer of FY is finished and the BAA replace operation is completed. Consequently, cancellation of the address X is completed at $T_{12}$, so that a not-in-BS state is reported when the BAA 5a is referred to due to FX at $T_{14}$. As a result, a block transfer from the MS is executed and a new data stored by the other processor is processed.

The operations of the processor 1a have been described in conjunction with an embodiment. The operations of the processor 1b are also the same when the processor 1a is regarded as the other processor.

Although the main storage is assigned as a shared storage in the embodiment, the system may be configured in such a manner that the main storage of FIG. 1 is replaced with an intermediate buffer storage and the main storage is provided as a higher-level unit over the intermediate buffer storage. In either of these cases, the term "address" indicates that assigned on the main storage.

We claim:

1. A storage control apparatus for a data processing system including a shared storage and a plurality of processors which share said shared storage, at least one of said plurality of processors having a buffer storage for retaining a copy of a part of data stored in said shared storage, said storage control apparatus associated with said at least one processor having the buffer storage, comprising:

a first buffer address array for storing addresses of data stored in said buffer storage and responsive to an access request from said one processor for indicating whether or not a data item exists in said buffer storage;

a second buffer address array for storing the same addresses as those stored in said first buffer address array; and control means connected to said first and second buffer arrays for updating the content of said second buffer address array and the content of said first buffer address array in response to a first signal indicating a block transfer of data from said shared storage to the buffer storage of said one processor and a second signal indicating a store operation of another processor, said control means including a first address array controller connected to said buffer storage and said first buffer address array for controlling the update of said first buffer address array, and a second address array controller connected to said first address array controller for searching said second buffer address array in response to receipt of said second signal in the form of a store address check request associated with a store operation conducted by said other processor on said shared storage to cancel the store operation address from said second buffer address array and to send a cancellation request to said first address array controller to cancel the store operation address registered in said first buffer address array when the address for said store operation is found in said second buffer address array, said second address array controller including means for replacing an address stored in said second buffer address array with another address in response to said first signal in the form of a replace indication for a block transfer request generated by said one processor and for sending a replace indication to said first address array controller to effect replacement of the same address therein;

wherein said first buffer address array includes means for accepting an access request which has been generated in said one processor on condition that no block transfer to the one processor is in progress and that the content of said first buffer address array associated with any block transfer by said control means has been updated; and wherein said second address array controller further includes a request stack operating in accordance with a first-in first-out algorithm and connected to said second buffer address array for stacking said store address check request, said replace indication, and said cancellation request generated within said second address array controller in the order of reception thereof and for issuing a refer, cancel or replace indication to said second buffer address array in response to a request issued therefrom; and a cancel/replace stack operating in accordance with the first-in first-out algorithm and connected to said first address array controller for stacking cancellation requests and replace indications in the order of reception thereof and for sending said stacked requests and indications to said first address array controller; whereby said second address array controller, when a store address check request is issued from said request stack, stacks a cancellation request in said cancel/replace stack in association with an indication made by said second buffer address array for the presence of an address associated with said store address search and further stacks a cancellation request in said request stack, and when a replace request is issued from said request stack, stacks a replace indication in said cancel/replace stack.

2. A storage control system according to claim 1 in which said first address array controller further comprises:

means for applying a cancellation request or a replace indication to said first buffer address array in response to receipt of a cancellation request or replace indication from said second address array controller;

indicator means for indicating that a block transfer is taking place;

reset means for resetting an indication by said indication means that a block transfer is taking place in response to the termination of the block transfer and a replace indication for said first buffer address array issued by said indication means; and means for preventing the first buffer address array of said one processor from accepting an access request when said indicator means indicates that a block transfer is taking place.

* * * * *